(12) United States Patent
Komano (10) Patent No.: US 8,365,161 B2
(45) Date of Patent: Jan. 29, 2013

(54) COMPATIBILITY DETERMINATION APPARATUS AND METHOD FOR ELECTRONIC APPARATUS

(75) Inventor: Takeshi Komano, Iwata (JP)

(73) Assignee: Yamaha Corporation (JP)

( * ) Notice: Subject to any disclaimer, the term of this patent is extended or adjusted under 35 U.S.C. 154(b) by 1561 days.

(21) Appl. No.: 11/779,887

(22) Filed: Jul. 19, 2007

(65) Prior Publication Data

US 2008/0022272 A1    Jan. 24, 2008

(30) Foreign Application Priority Data

Jul. 20, 2006  (JP) ................................. 2006-198144

(51) Int. Cl.
*G06F 9/44* (2006.01)
*G06F 9/445* (2006.01)

(52) U.S. Cl. ......... 717/170; 717/122; 717/174; 717/175

(58) Field of Classification Search .................. None
See application file for complete search history.

(56) References Cited

U.S. PATENT DOCUMENTS

| | | | | |
|---|---|---|---|---|
| 6,971,093 | B1* | 11/2005 | Spring | 717/170 |
| 7,055,147 | B2* | 5/2006 | Iterum et al. | 717/170 |
| 7,093,232 | B1* | 8/2006 | Chatzigianis et al. | 717/122 |
| 7,415,706 | B1* | 8/2008 | Raju et al. | 717/170 |
| 7,562,358 | B2* | 7/2009 | Bennett et al. | 717/170 |
| 7,689,985 | B2* | 3/2010 | Callender | 717/175 |
| 7,765,538 | B2* | 7/2010 | Zweifel et al. | 717/168 |
| 7,861,239 | B2* | 12/2010 | Mayfield et al. | 717/170 |
| 2001/0044935 | A1* | 11/2001 | Kitayama | 717/11 |
| 2004/0133291 | A1 | 7/2004 | Nakayama et al. | |
| 2006/0007815 | A1* | 1/2006 | Erickson et al. | 369/47.1 |
| 2006/0023622 | A1* | 2/2006 | Suh | 369/275.3 |
| 2007/0006222 | A1* | 1/2007 | Maier et al. | 717/174 |
| 2007/0214453 | A1* | 9/2007 | Dive-Reclus | 717/175 |

FOREIGN PATENT DOCUMENTS

| | | |
|---|---|---|
| JP | 03-202920 A | 9/1991 |
| JP | 2004-56401 A | 2/2004 |

OTHER PUBLICATIONS

Yoon et al., Direct-dependency-based software compatibility testing, Nov. 2007, 4 pages, <http://delivery.acm.org/10.1145/1330000/1321696/p409-yoon.pdf>.*

Office Action issued in corresponding Japanese patent application No. JP2006-198144, mailing date Nov. 8, 2011. English translation is provided.

* cited by examiner

*Primary Examiner* — Thuy Dao

(74) *Attorney, Agent, or Firm* — Rossi, Kimms & McDowell LLP

(57) ABSTRACT

Compatibility determination apparatus and method can properly determine compatibility between elements in an electronic music apparatus. When a reproducing program holds version information indicating, for example, that the own version of the program is 4.0 and music contents of versions 1.0 and 2.0 are reproducible by the program, and a music content holds version information indicating, for example, that the own version of the music content is 3.0 and programs of versions 4.0 and 5.0 can be reproduced on the music content side, the program of version 4.0 can be reproduced on the music content side. Although the information held in the program side does not indicate that a music content of version 3.0 is reproducible by the program, the music content of version 3.0 can be reproduced by the program of version 4.0. Thus, the apparatus and method can properly determine compatibility between the elements.

11 Claims, 3 Drawing Sheets

FIG.3

COMPATIBILITY DETERMINATION APPARATUS AND METHOD FOR ELECTRONIC APPARATUS

BACKGROUND

Conventionally, there have been known compatibility determination apparatuses that determine compatibility between elements such as programs, drivers, contents, etc., for use in an electronic music apparatus. In such compatibility determination apparatuses, some are adapted to check the matching between versions of functional blocks at start of power supply to the apparatus, and continue the operation thereof as long as there is no version mismatch. On the other hand, if there is a version mismatch, the apparatus gives a warning to a user. See for example Japanese Laid-open Patent Publication No. 2004-56401.

With the above conventional compatibility determination apparatus, in some cases, compatibility between elements cannot be properly determined by the version check. For example, there can be cases where a music content reproducing program of version 3.0 can reproduce music contents of version 1.0 but cannot reproduce those of version 2.0. In another example, a reproducing program of version 4.0 can reproduce music contents of versions 1.0 and 2.0. In such a case, the reproducing program of version 4.0 is called compatible with music contents of version 1.0 or higher.

Nevertheless, if a music content of version 3.0 becomes available after the appearance of the reproducing program of version 4.0, it is not guaranteed that the reproducing program of version 4.0 can reproduce the music content of version 3.0 (even though higher than version 1.0), although it is correct to state at the time of appearance of a music content of version 2.0 that the reproducing program of version 4.0 is compatible with music contents of version 1.0 or higher. However, this statement does not guarantee that the reproducing program of version 4.0 can reproduce music contents of version 3.0 or higher, which appear after the appearance of the reproducing program of version 4.0. In other words, there is a possibility that compatibility between the reproducing program and music contents is not always maintained at the discretion of contents providers. On the other hand, there can be cases where the compatibility is maintained to enable the reproducing program of version 4.0 to reproduce music contents of version 3.0.

As described above, when a new version of some element becomes available, the conventional compatibility determination apparatus can no longer reliably determine whether there is compatibility between that element and other elements. For example, even when the compatibility is maintained in actuality, a statement that there is a possibility of incapability of reproduction is sometimes displayed. In some cases, the reproduction of music contents becomes impossible without any statement of reasons, which confuses the user.

In order to ensure the compatibility between a reproducing program and a music content, the reproducing program can be updated to its latest version upon each appearance of a new version of the music content. If the already installed program is compatible with the new version of the music content, such updating is rather unnecessary and the user's updating operation is wasteful and laborious. Updating failure, if any, can make the user's system partly or entirely inoperative, and therefore, it is preferable that the frequency of updating operations be reduced to a minimum.

The above described problem can occur not only between a reproducing program and a music content, but also between programs (for instance, between a main CPU program and a sub CPU program), between a CPU program and a device driver, and between a device driver and a program.

SUMMARY OF THE INVENTION

The present invention relates to compatibility determination apparatus and method for determining compatibility between a plurality of elements, such as programs, drivers, contents, etc., for an electronic apparatus, in particular an electronic music apparatus.

One aspect of the present invention is a compatibility determination apparatus for an electronic apparatus that includes at least first and second predetermined elements to be subjected to compatibility determination. The first predetermined element provides at least a first data containing an own version of the first predetermined element and a second data containing at least one version of the second predetermined element that is compatible with the first predetermined element, and the second predetermined element provides at least a third data containing an own version of the second predetermined element and a fourth data containing at least one version of the first predetermined element that is compatible with the second predetermined element. The compatibility determination apparatus can include an input unit and a determination unit.

The input unit can input at least the first data, the second data, the third data, and the fourth data of the first and second predetermined elements to be subjected to compatibility determination. The determination unit can determine compatibility between the first and second predetermined elements based on the first data, the second data, the third data, and the fourth data.

The determination unit determines existence of compatibility between the first and second predetermined elements when at least one of the second data or the fourth data contains a compatibility version that matches the own version in at least one of the third data or the first data. In other words, the determination unit can determine compatibility between a pair of predetermined elements when the information corresponding to at least one of the pair of predetermined elements indicates presence of compatibility therebetween.

The first and second predetermined elements can be selected among programs, device drivers, and music content data for the electronic music apparatus. That is compatibility between programs, between a program and one of a device driver or a music content data, or between a device driver and a music content data, for example. For instance, the first predetermined element can be a program and the second predetermined element can be a music content data.

The electronic apparatus can include a display that displays a compatibility warning when the determination unit determines that the first and second predetermined elements are not compatible. The display can also display an update prompt for updating one of the program or the music content data.

The first data and the second data can be held in the first predetermined element and the third data and the fourth data can be held in the second predetermined element.

Another aspect of the present invention is a method of determining compatibility for an electronic apparatus that includes at least the first and second predetermined elements to be subjected to compatibility determination. The method can include the steps of providing at least the first data and the second data, providing at least the third data and the fourth data. The method further includes the steps of inputting the first data, the second data, the third data, and the fourth data of the first and second predetermined elements to be subjected to compatibility determination, and determining compatibility between the first and second predetermined elements based on the first data, the second data, the third data, and the fourth data.

The determining step determines existence of compatibility between the first and second predetermined elements when at least one of the second data or the fourth data contains a compatibility version that matches the own version in at least one of the third data or the first data. In other words, the determination step can determine compatibility between a pair of predetermined elements when the information corresponding to at least one of the pair of predetermined elements indicates presence of compatibility therebetween.

Again, the first predetermined element can be a program and the second predetermined element can be a music content data. The method can further include the step of displaying a compatibility warning in a display of the electronic device when the determination step determines that the first and second predetermined elements are not compatible. The method can further include the step of displaying in the display an update prompt for updating one of the program or the music content data. The method can further include the step of updating the first and second predetermined elements. The first data and the second data can be held in the first predetermined element and the third data and the fourth data can be held in the second predetermined element.

Further features of the present invention will become apparent from the following description of an exemplary embodiment with reference to the attached drawings.

BRIEF DESCRIPTION OF THE DRAWINGS

FIG. 1 is a block diagram schematically showing the construction of an electronic music apparatus to which a compatibility determination apparatus according to one embodiment of the present invention can be applied to;

DETAILED DESCRIPTION

Figure 1:
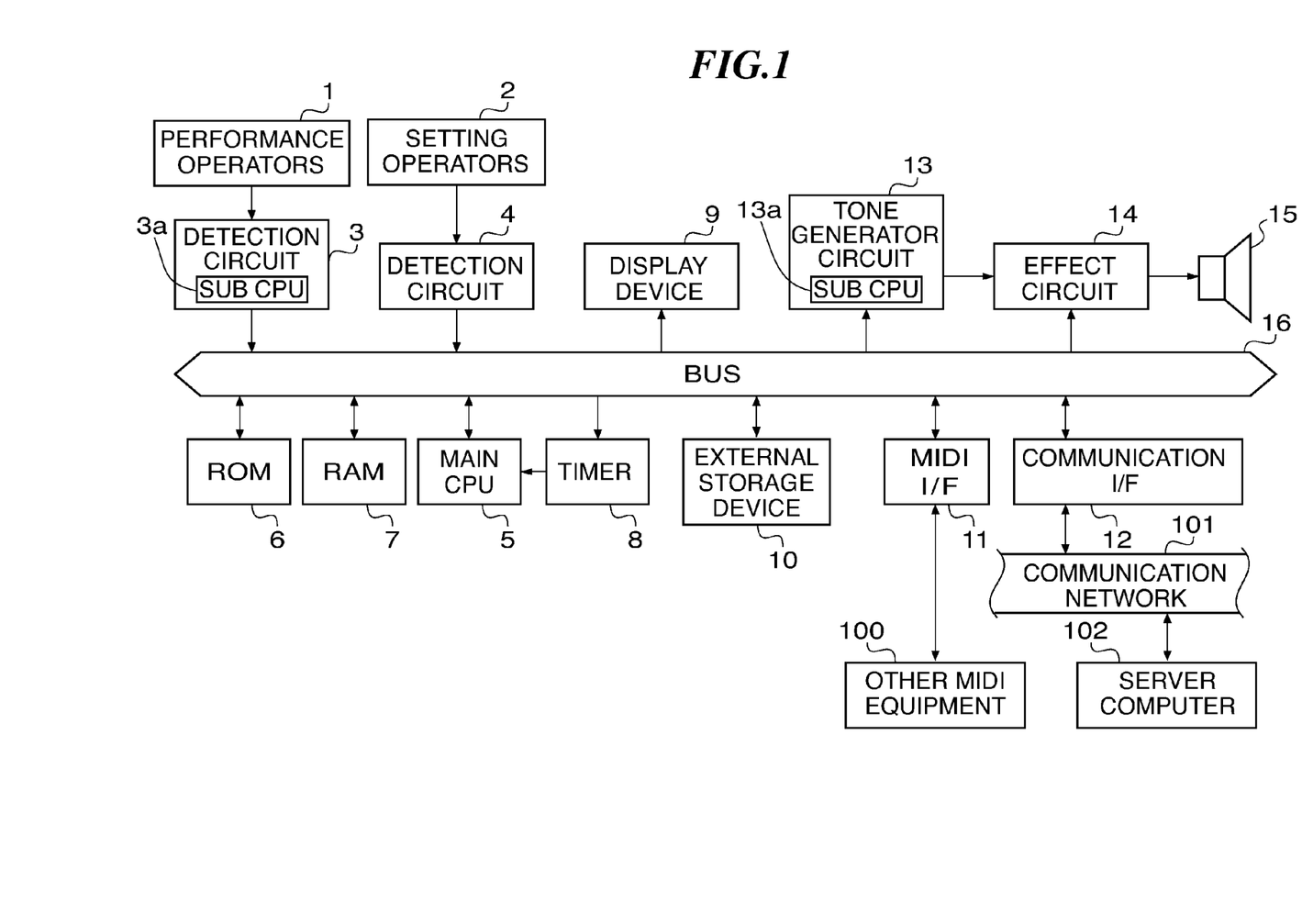

Referring to FIG. 1, which is a block diagram schematically showing the construction of an electronic music apparatus to which a compatibility determination apparatus according to one embodiment can be incorporated. The electronic music apparatus of this embodiment can include performance operators 1, including a keyboard for inputting pitch information, setting operators 2, including a plurality of switches, a wheel, and a joystick for inputting various kinds of information, a detection circuit 3 for detecting operative states of the performance operators 1, a detection circuit 4 for detecting operative states of the setting operators 2, a main CPU 5 for controlling the entire apparatus, a ROM 6 for storing main CPU control programs executed by the main CPU 5, various table data, etc., a RAM 7 for temporarily storing music contents, various input information, computation results, etc., a timer 8 for measuring interrupt time for timer interrupt processing and various kinds of time, a display device 9 comprised of a liquid crystal display (LCD) and light emitting diodes (LEDs) for displaying various information, etc., an external storage device 10 for storing various application programs, including the main CPU control programs, various music contents, and various other data, a MIDI interface (I/F) 11 for inputting MIDI messages from external devices and outputs MIDI messages to external devices, a communication interface (I/F) 12 for performing transmission and reception of data to and from a server computer (hereinafter simply referred to as "the server") 102 via a communication network 101, a tone generator circuit 13 for converting performance data input by the performance operators 1, preset music contents, and other data into audio signals, an effect circuit 14 for applying various effects to audio signals from the tone generator circuit 13, and a sound system 15 for converting audio signals from the effect circuit 14 into sounds and is comprised of a DAC (Digital-to-Analog Converter), an amplifier, a speaker, etc.

The above components 3 to 14 are connected to one another via a bus 16. The timer 8 is connected to the main CPU 5, other MIDI equipment 100 to the MIDI I/F 11, the communication network 101 to the communication I/F 12, the effect circuit 14 to the tone generator circuit 13, and the sound system 15 to the effect circuit 14, respectively. The communication I/F 12 and the communication network 101 can be of a wired type. Alternatively, they can be of a wireless type or a wired/wireless type.

The external storage device 10 can be implemented, for example, by a flexible disk drive (FDD), a hard disk drive (HDD), a CD-ROM drive, a magnetic-optical disk (MO) drive, or the like. The external storage device 10 can store the main CPU control programs executed by the main CPU 5, as mentioned above. The main CPU control programs need not be stored in the ROM 6, but can be stored in the external storage device 10. By reading out the programs from the external storage device 10 and storing the same in the RAM 6, the main CPU 5 can operate in the same manner as if the main CPU control programs were stored in the ROM 6. This enables adding a main CPU control program and upgrading the versions of the control programs with ease.

The detection circuit 3 and the tone generator circuit 13 are mounted with sub CPUs 3a, 13a, respectively. As with the main CPU 5, each of the sub CPUs 3a, 13a executes sub CPU control programs to thereby execute various controls. In this embodiment, the sub CPU control programs are stored in the ROM 6, as with the main CPU control programs. It should be noted that it is assumed in this embodiment that the sub CPU control programs are rewritten into new versions thereof. To this end, the ROM 6 is implemented by a memory device capable of rewriting stored contents, such as for example a flush memory.

The display device 9, the external storage device 10, the MIDI I/F 11, the communication I/F 12, etc., are respectively controlled by dedicated device drivers. In this embodiment, the device drivers are stored in the ROM 6 and rewritten into new versions in appropriate times. It should be noted that new versions of main CPU control programs, sub CPU control programs, device drivers, and music contents can be downloaded for upgrade via the communication I/F 12 from the server 102 or can be supplied from a removal external storage medium to the electronic music apparatus.

As will be understood from the above described construction, the electronic music apparatus of this embodiment can be constructed in an electronic music instrument. The electronic music apparatus implemented by an electronic music instrument is not necessarily a keyboard instrument, but can be a stringed instrument, a wind instrument, a percussion instrument, or the like. Further, a tone generator apparatus, an electronic music apparatus, and so forth need not be incorporated into the main body of one electronic instrument, but can be configured separately from one another and connected together via conventional communication means, such as a MIDI I/F and various kinds of networks.

Further, the electronic music apparatus can be constructed on a dedicated apparatus, other than an electronic music instrument, comprising the minimum elements that can practice according to the present invention. Examples of the dedicated apparatuses include a karaoke machine, a game machine, and a portable communication terminal, such as a cellular phone. When the dedicated apparatus incorporates a portable communication terminal, it is not necessary to configure the communication terminal to achieve the entirety of predetermined functions, but part of the functions can be assigned to a server so that the predetermined functions can be realized by a system comprised of the communication terminal and the server. Alternatively, a general-purpose computer can be configured to function as the electronic music apparatus.

In the following, the outline of a control process executed by the electronic music apparatus described above will be explained with reference to FIG. 2, and next the details thereof will be described with reference to FIG. 3.

Figure 2:
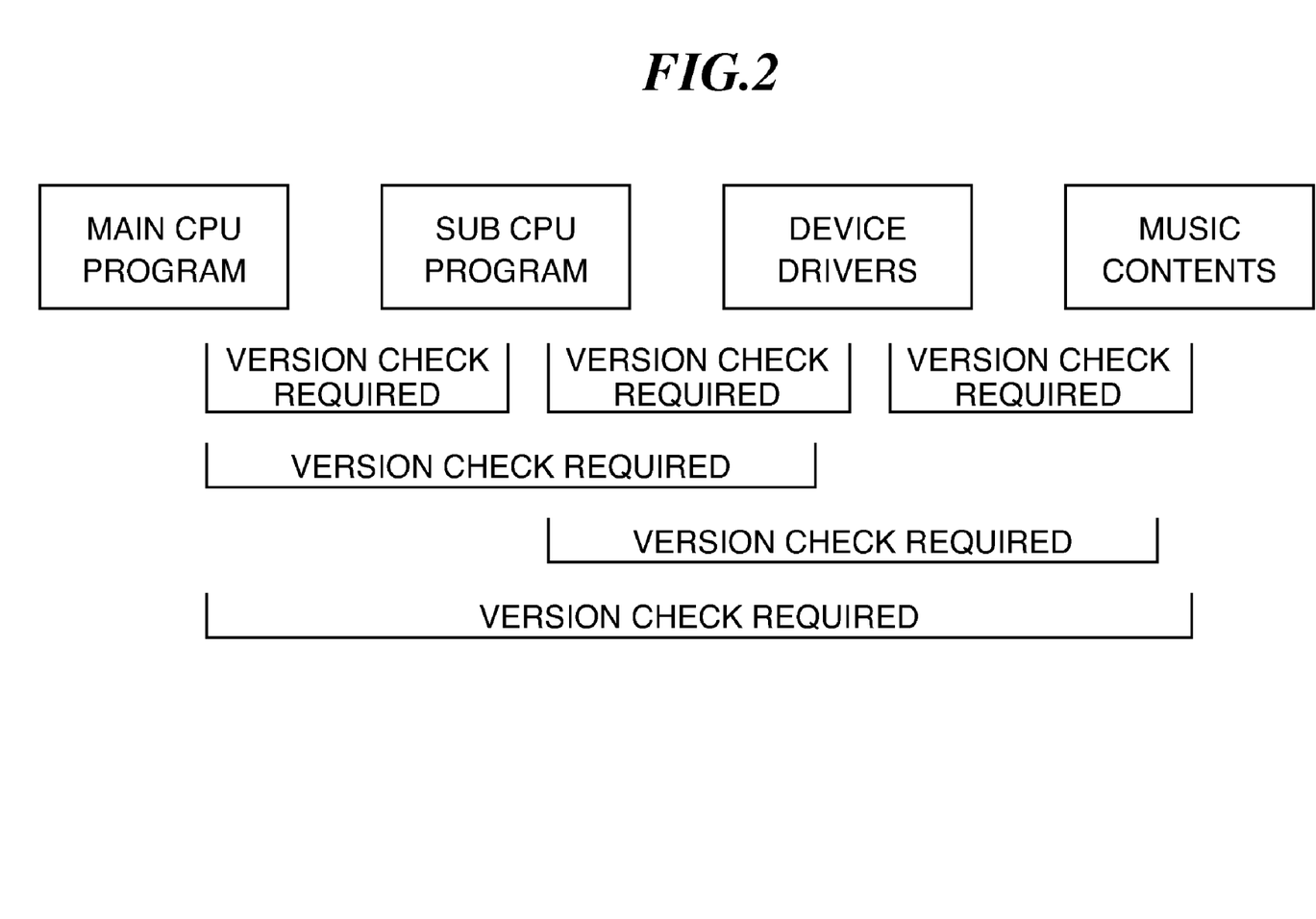
FIG. 2 is a view showing between which of elements a version check is required.
Figure 3:
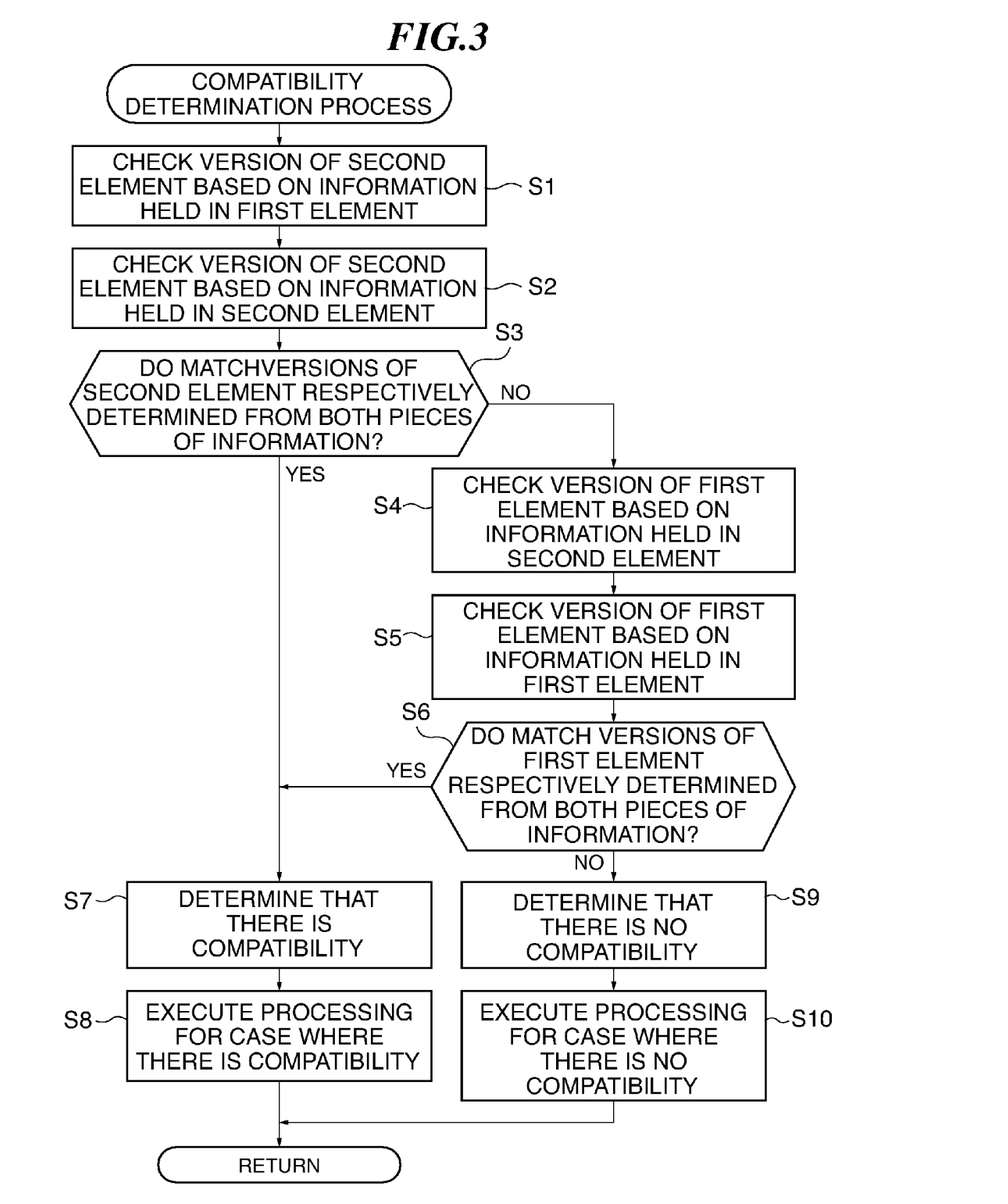
FIG. 3 is a flowchart showing the compatibility determination process executable by the compatibility determination apparatus, which can be a main CPU of the apparatus shown in FIG. 1.

Referring to FIG. 2, which is a view showing between which of elements a version check is required, a plurality of elements of this embodiment are comprised of main CPU programs, sub CPU control programs, various device drivers, and various music contents. As shown in FIG. 2, a version check must be made between any two types of elements among the plurality of elements. It should be noted that the main CPU programs mentioned herein are not the above-mentioned main CPU control programs, but are application programs typically such as music content reproducing programs. However, the main CPU programs can include part or all of the main CPU control programs so that these main CPU control programs can be subjected to compatibility determination. It should be noted that the version check is carried out to determine compatibility between elements, as will be described later.

Each of the elements is adapted to hold information (hereinafter referred to as the "version information") indicating an own version of the element and one or more versions of each of one or more other elements to be subjected to version check. To hold respective ones of pieces of version information in the elements, these pieces of version information are typically stated in headers usually provided in the elements, but this is not limitative. The pieces of version information can be held in one or more regions provided independently of the elements. In relation to compatibility determination, the main CPU 5 (compatibility determination apparatus) inputs pieces of version information corresponding to a plurality of elements for use in the electronic music apparatus in correspondence with the plurality of elements. However, it is not essentially required to provide pieces of version information respectively corresponding to all of the plurality of elements. Alternatively, it is possible to provide pieces of version information respectively corresponding to predetermined elements to be subjected to compatibility determination among the plurality of elements. In that case, the main CPU 5 inputs pieces of version information corresponding to the predetermined elements in correspondence with the predetermined elements. In this embodiment, each version information is held in a corresponding one of the elements, and therefore, at the same time when an arbitrary element is input, corresponding version information is input in correspondence with the input element.

In the following, a method will be concretely described, in which the main CPU 5 determines compatibility between a main CPU program and a music content (music content data).

It is assumed here that the below-mentioned pieces of version information are held in the main CPU program and the music content. It should be noted that the below-mentioned pieces of version information are only part of pieces of version information held in the main CPU program and the music content, and includes version information used for determination of compatibility between the main CPU program and the music content and other version information, such as sub CPU control program version and device driver version, used for other compatibility determination.

Version information held in the main CPU program can include the following:
Own version of the main CPU program: 4.0
Main-CPU-program-compatible versions of a sub CPU control program: 1.0, 2.0, and 3.0
Main-CPU-program-compatible versions of a device driver: 1.0 and 1.1
Main-CPU-program-compatible versions of the music content: 1.0 and 2.0

Version information held in the music content can include the following:
Own version of the music content: 3.0
Music-content-compatible versions of the main CPU program: 4.0 and 5.0
Music-content-compatible versions of a sub CPU control program: 3.0
Music-content compatible version of a device driver: 1.1

In the aforementioned case, none of the main-CPU-program-compatible versions (=1.0 and 2.0) of the music content indicated by the version information held in the main CPU program match the own version (=3.0) of the music content. On the other hand, one of the music-content-compatible versions (=4.0 and 5.0) of the main CPU program indicated by the version information held in the music content matches the own version (=4.0) of the main CPU program. Therefore, the main CPU 5 determines that there is compatibility between the main CPU program and the music content.

Next, the control process will be described in detail. FIG. 3 is a flowchart showing the procedure of a compatibility determination process executable by the compatibility determination apparatus shown in FIG. 1, in particular by a main CPU 5 thereof.

The compatibility determination process determines the presence or absence of compatibility between any two types of elements. Two types of elements are selected from the main CPU programs, sub CPU control programs, various device drivers, and various music contents, which are shown in FIG. 2. In this compatibility determination process, one of the two types of elements is referred to as a first element and another type of element is referred to as a second element. It should be noted that the compatibility determination process is started and then executed in timing determined according to the types of elements to be subjected to the determination process, i.e., the types of the first and second elements. Specifically, to determine compatibility between programs (for instance, between a main CPU program and a sub CPU control program) or between a program (for instance, a main CPU program or a sub CPU control program) and a device driver, the compatibility determination process can be executed in timing at which the electronic music apparatus is started by supplying electric power or in an arbitrary timing after the start of the electronic music apparatus. To determine compatibility between a program and a music content, or between a device driver and a music content, the compatibility determination process can be executed immediately before the start of reproduction of the music content.

In the compatibility determination process, the following are carried out:

(1) Based on the version information held in the first element, one or more first-element-compatible versions of the second element are checked (step S1), and based on the version information held in the second element, the own version of the second element is checked (step S2), thereby determining whether or not the versions of the second element respectively determined from these version information match each other (step S3).

(2) If it is determined in the determination (1) that the versions of the second element respectively determined from the version information held in the first and second elements do not match each other, one or more second-element-compatible versions of the first element are checked based on the version information held in the second element (steps S3 to S4), and based on the version information held in the first element, the own version of the first element is checked (step S5), thereby determining whether or not the versions of the first element respectively determined from the version information held in the first and second elements match each other (step S6).

(3) If it is determined in the determination (1) that the versions of the second element respectively determined from the pieces of version information match each other, or if it is determined in the determination (2) that the versions of the first element respectively determined from the pieces of information match each other, it is determined that there is compatibility between the first and second elements (step S3 or steps S6 to S7), and a process for a case where there is compatibility is executed (step S8).

(4) If it is determined in the determination (1) that the versions of the second element respectively determined from the pieces of information do not match each other and if it is determined in the determination (2) that the versions of the first element respectively determined from the pieces of information do not match each other, it is determined that there is no compatibility between the first and second elements (steps S6 to S9), and a process for a case where there is no compatibility is executed (step S10).

To implement at the step S8 the process for a case where there is compatibility, a statement "it is determined that there is compatibility" is displayed on the display device 9, for instance. Alternatively, no action needs to be taken. If the first and second elements are a music content reproducing program and a music content, respectively, an instruction to reproduce the music content is given to the music content reproducing program. On the other hand, if the first and second elements are a main CPU program and a sub CPU control program, or a program (a main CPU program or a sub CPU control program) and a device driver, only the display of the above statement is given or no actions are taken, and a program updating process is not performed.

To implement at the step S10 the process for a case where there is no compatibility, if the first and second elements are a music content reproducing program and a music content, a statement "It is determined that there is no compatibility, so that the music content cannot be reproduced" can be displayed on the display device 9. Then, a statement to recommend the user to update the music content reproducing program can be displayed, or the music content reproducing program can be automatically updated.

In the following, the compatibility determination will be concretely described for a case where the first and second elements are a music content reproducing program and a music content, respectively with Examples.

Example 1 provides the following:
Version information held in the music content reproducing program:
Own version of the reproducing program: 4.0
Versions of music content reproducible by the reproducing program: 1.0 and 2.0
Version information held in the music content:
Own version of the music content: 3.0
Versions of the reproducing program reproducible on the music content side: 4.0 and 5.0

In Example 1, the reproducing program of version 4.0 can be reproduced on the music content side although there is no statement in the version information held in the reproducing program that the music content of version 3.0 is reproducible by the reproducing program. Thus, the music content of version 3.0 can be reproduced by the reproducing program of version 4.0 without any difficulty. Therefore, it is determined that there is compatibility.

Example 2 provides the following:
Version information held in the music content reproducing program:
Own version of the reproducing program: 6.0
Versions of the music content reproducible by the reproducing program: 1.0, 2.0, 3.0, and 4.0
Version information held in the music content:
Own version of the music content: 3.0
Versions of the reproducing program reproducible on the music content side: 4.0 and 5.0

In Example 2, it is stated in the version information held in the reproducing program that the music content of version 3.0 is reproducible by the reproducing program. Thus, although there is no statement that the reproducing program of version 6.0 can be reproduced on the music content side, the music content of version 3.0 can be reproduced by the reproducing program of version 6.0 without any trouble. Accordingly, it is determined that there is compatibility.

Example 3 provides the following:
Version information held in the music content reproducing program:
Own version of the reproducing program: 4.0
Versions of the music content reproducible by the reproducing program: 1.0 and 2.0
Version information held in the music content:
Own version the music content: 4.0
Versions of the reproducing program reproducible on the music content side: 5.0 and 6.0

In Example 3, there is no statement that the reproducing program of version 4.0 is reproducible on the music content side and the music content of version 4.0 is reproducible by the reproducing program. Thus, the music content of version 4.0 cannot be reproduced by the reproducing program of version 4.0. Thus, it is determined that there is no compatibility. In that case, it is preferable to give the user a warning to indicate the incapability of reproduction, or recommend updating of the reproducing program, or automatically update the reproducing program.

As described above, in this embodiment, each of paired elements to be subjected to the compatibility determination holds version information indicating its own version and one or more element-compatible versions of another element. In determining the compatibility between the paired elements based on pieces of version information respectively held in the paired elements, it is determined that there is compatibility, if at least one of the pieces of version information indicates the presence of compatibility between the paired elements. As a result, for example, if there is a statement in the version information held in a music content that the music content is reproducible by the reproducing program of versions 4.0 and 5.0, it is possible to determine that the reproducing program with own version 4.0 can reproduce the music content.

On the other hand, if there is a statement in the version information held in the music content that the music content is reproducible by the reproducing program of program version 5.0, it is possible to determine that the reproducing program with its own version 4.0 cannot reproduce the music content. Based on the determination, an appropriate action (such as performing automatic reproduction or providing a warning indicative of incapability of reproduction) can be taken.

Conversely, even though the reproducing program has its own version (e.g., 6.0) which is different from versions 4.0 and 5.0 of the reproducing program indicated in the version information held in the music content as being capable of reproducing the music content, if there is a statement in the version information held in the music content that the music content of the version in question is reproducible, it is possible to determine that the music content can be reproduced by the reproducing program, which makes it possible to implement an appropriate action.

In this embodiment, compatibility between two elements is determined. However, the compatibility determination can be made not only between two elements but also between three or more elements. For instance, the matching of versions of a main CPU program, a sub CPU control program, and a device driver can be checked, and based on the result of check, compatibility between three types of elements can be determined.

It is to be understood that the present invention can also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention. Examples of the storage medium for supplying the program code include a Floppy® disk, a hard disk, a magnetic-optical disk, an optical disk such as a CD-ROM, a CD-R, a CD-RW, a DVD-ROM, a DVD-RAM, a DVD-RW, a DVD+RW, a magnetic tape, a nonvolatile memory card, and a ROM. Alternatively, the program can be supplied from a server computer via a communication network.

Further, it is to be understood that the functions of the above described embodiment can be accomplished not only by executing the program code read out by a computer, but also by causing an OS or the like which operates on the computer to perform a part or all of the actual operations based on instructions of the program code.

Further, it is to be understood that the functions of the above described embodiment can be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

According to one aspect of the present invention, a compatibility determination apparatus can include an input unit adapted to input a plurality of elements for an electronic music apparatus, including predetermined elements to be subjected to compatibility determination. The input unit is adapted to input pieces of information in correspondence with respective ones of at least the predetermined elements among the plurality of elements. Each of the pieces of information includes an own version of a corresponding one of the plurality of elements and at least one version of each of at least one other element with which the corresponding one of the plurality of elements is compatible. A determination unit determines whether compatibility exists between the predetermined elements based on the pieces of information respectively corresponding to at least the predetermined elements. The determination unit determines existence of compatibility between the predetermined elements when it is determined from the information corresponding to at least one of the predetermined elements that the at least one of the predetermined elements has compatibility with other predetermined element.

The determination unit determines that compatibility exists between the predetermined elements to be subjected to compatibility determination among a plurality of input elements based on information respectively corresponding to at least the predetermined elements, if the information corresponding to at least one of the predetermined elements indicates that the at least one of the predetermined elements has compatibility with other predetermined element.

When the determination unit determines, from the information corresponding to one of the predetermined elements, that there is compatibility between the predetermined elements, the determination unit can omit compatibility determination based on the information corresponding to other predetermined element.

When the determination unit determines, from the information corresponding to one of the predetermined elements, that there is no compatibility between the predetermined elements, the determination unit carries out compatibility determination based on the information corresponding to other predetermined element. If it is determined in the compatibility determination that there is compatibility, the determination unit can conclude that there is compatibility between the predetermined elements.

The determination unit can determine, based on information corresponding to each set of paired elements selected from the predetermined elements, compatibility between each set of paired elements, and the determination unit can determine that there is compatibility between paired elements when the information corresponding to at least one of the paired elements indicates presence of compatibility between the paired elements.

The predetermined elements can be selected from programs, device drivers, and music contents for the electronic music apparatus so that compatibility between programs, between a program and a device driver or a music content, and between a device driver and a music content can be properly determined.

The pieces of information can be respectively held in at least the predetermined elements among the plurality of elements. Pieces of information respectively corresponding to a plurality of elements can be input at the same time when the plurality of elements are input, and predetermined elements and corresponding information can easily be made in correspondence with one another, making it easier to carry out the compatibility determination.

According to another aspect of the present invention, a compatibility determination method can include an input step of inputting a plurality of elements for an electronic music apparatus, including predetermined elements to be subjected to compatibility determination. Pieces of information are input in the input step in correspondence with respective ones of at least the predetermined elements among the plurality of elements. Each of the pieces of information indicating an own version of a corresponding one of the plurality of elements and at least one version of each of at least one other element with which the corresponding one of the plurality of elements is compatible. The method further includes a determination step of determining existence of compatibility between the predetermined elements based on the pieces of information respectively corresponding to at least the predetermined elements. The determination step determines existence of compatibility between the predetermined elements when the information corresponding to at least one of the predetermined elements indicates that the at least one of the predetermined elements has compatibility with other predetermined element.

While the present invention has been particularly shown and described with reference to preferred embodiment thereof, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

This application is based on, and claims priority to, JP PA 2006-198144 filed on 20 Jul. 2006. The disclosure of the priority application, in its entirety, including the drawings, claims, and the specification thereof, is incorporated herein by reference.

What is claimed is:

1. A method of determining compatibility for an electronic apparatus that includes at least first and second predetermined elements, the method comprising the steps of:
providing, in the first predetermined element, at least a first data containing an own version of the first predetermined element and a second data containing at least one version of the second predetermined element that is compatible with the first predetermined element;
providing, in the second predetermined element, at least a third data containing an own version of the second predetermined element and a fourth data containing at least one version of the first predetermined element that is compatible with the second predetermined element;
inputting the first data, the second data, the third data, and the fourth data of the first and second predetermined elements; and
checking the version of the second predetermined element with the version of the second predetermined element contained in the second data;
checking the version of the second predetermined element with the version of the second predetermined element contained in the third data;
checking the version of the first predetermined element with the version of the first predetermined element contained in the fourth data;
checking the version of the first predetermined element with the version of the first predetermined element contained in the first data; and
determining that compatibility between the first and second predetermined elements exists when one of the second data or the fourth data contains a compatibility version that matches the own version in one of the third data or the first data,
wherein the first data, the second data, the third data, the fourth data, and the first predetermined element, and the second predetermined element are distinct from each other.

2. The method according to claim 1, wherein the first and second predetermined elements are selected from programs, device drivers, and music content data for the electronic apparatus.

3. The method according to claim 2, wherein the first predetermined element is a program and the second predetermined element is a music content data.

4. The method according to claim 3, further comprising the step of displaying a compatibility warning in a display of the electronic device when the determining step determines that the first and second predetermined elements are not compatible.

5. The method according to claim 4, further comprising the step of displaying in the display an update prompt for updating one of the program or the music content data.

6. The method according to claim 5, further comprising the step of updating the first and second predetermined elements.

7. A compatibility determination apparatus for an electronic apparatus including at least first and second predetermined elements, the first predetermined element providing at least a first data containing an own version of the first predetermined element and a second data containing at least one version of the second predetermined element that is compatible with the first predetermined element, and the second predetermined element providing at least a third data containing an own version of the second predetermined element, and a fourth data containing at least one version of the first predetermined element that is compatible with the second predetermined element, the compatibility determination apparatus comprising:
an input unit that inputs at least the first data, the second data, the third data, and the fourth data of the first and second predetermined elements; and
a processor programmed to:
check the version of the second predetermined element with the version of the second predetermined element contained in the second data;
check the version of the second predetermined element with the version of the second predetermined element contained in the third data;
check the version of the first predetermined element with the version of the first predetermined element contained in the fourth data;
check the version of the first predetermined element with the version of the first predetermined element contained in the first data;
determine that compatibility between the first and second predetermined elements exists when one of the second data or the fourth data contains a compatibility version that matches the own version in one of the third data or the first data,
wherein the first data, the second data, the third data, the fourth data, and the first predetermined element, and the second predetermined element are distinct from each other.

8. The compatibility determination apparatus according to claim 7, wherein the first and second predetermined elements are selected from programs, device drivers, and music content data for the electronic apparatus.

9. The compatibility determination apparatus according to claim 8, wherein the first predetermined element is a program and the second predetermined element is a music content data.

10. The compatibility determination apparatus according to claim 9, wherein the electronic apparatus further includes a display that displays a compatibility warning when the processor determines that the first and second predetermined elements are not compatible.

11. The compatibility determination apparatus according to claim 10, wherein the display displays an update prompt for updating one of the program or the music content data.

* * * * *